(12) United States Patent
Ertmer et al.

(10) Patent No.: US 9,050,680 B2
(45) Date of Patent: Jun. 9, 2015

(54) WELDING WIRE FEED SYSTEM AND METHOD

(71) Applicant: Illinois Tool Works Inc., Glenview, IL (US)

(72) Inventors: Jonathan R. Ertmer, Greenville, WI (US); Jeff Lenzner, Appleton, WI (US); Kenneth A. Stanzel, Appleton, WI (US); Ronald D. Woodward, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/053,339

(22) Filed: Oct. 14, 2013

(65) Prior Publication Data

US 2014/0034627 A1 Feb. 6, 2014

Related U.S. Application Data

(63) Continuation of application No. 11/502,803, filed on Aug. 10, 2006, now Pat. No. 8,575,517.

(51) Int. Cl.
*B23K 9/133* (2006.01)
*B23K 9/12* (2006.01)

(52) U.S. Cl.
CPC .............. *B23K 9/1336* (2013.01); *B23K 9/124* (2013.01)

(58) Field of Classification Search
CPC .... B23K 9/133; B23K 9/1333; B23K 9/1336; B23K 9/12; B23K 9/121; B23K 9/122; B23K 9/123; B65H 57/00; B65H 57/04

USPC ............ 219/137.7, 137.2; 226/187, 176, 177, 226/181
See application file for complete search history.

(56) References Cited

U.S. PATENT DOCUMENTS

| | | | | |
|---|---|---|---|---|
| 1,873,326 A | * | 8/1932 | Ratigan | ......................... 403/348 |
| 3,734,369 A | | 5/1973 | Johnson | |
| 5,410,126 A | | 4/1995 | Miller | |
| 5,816,466 A | * | 10/1998 | Seufer | ........................ 226/187 |
| 6,286,748 B1 | | 9/2001 | Cooper | |
| 6,356,644 B1 | | 3/2002 | Pollak | |
| 6,388,234 B1 | * | 5/2002 | Collins et al. | .............. 219/137.7 |
| 6,427,894 B1 | | 8/2002 | Blank | |
| 6,536,644 B2 | * | 3/2003 | Plow | ............................. 226/190 |
| 6,568,578 B1 | * | 5/2003 | Kensrue | ....................... 226/176 |
| 2005/0016976 A1 | | 1/2005 | Belfiore | |
| 2005/0040202 A1 | | 2/2005 | Kerekes | |
| 2005/0224486 A1 | | 10/2005 | Matiash | |

FOREIGN PATENT DOCUMENTS

| | | |
|---|---|---|
| DE | 20113852 | 11/2001 |
| EP | 1577245 A2 | 9/2005 |
| WO | 03022501 A2 | 3/2003 |

* cited by examiner

*Primary Examiner* — Brian Jennison
(74) *Attorney, Agent, or Firm* — Fletcher Yoder P.C.

(57) ABSTRACT

In one embodiment, a system is provided with a welding wire feeder that includes a first wheel having a first rotational direction, and a second wheel having a second rotational direction opposite from the first rotational direction. The first and second wheels are disposed compressively about a wire feed region, and the first and second wheels are drivingly coupled together to output substantially equal tangential speeds in the wire feed region. In addition, the first wheel, or the second wheel, or both the first and second wheels comprise a drive wheel directly coupled to a gear without separately coupling both the drive wheel and the gear to a shaft.

16 Claims, 4 Drawing Sheets

WELDING WIRE FEED SYSTEM AND METHOD

BACKGROUND

The present invention relates generally to welding systems, and particularly to a wire-feed welding system.

A variety of welding systems, such as Metal Inert Gas (MIG) welding, include a wire feed mechanism. Unfortunately, existing wire feed mechanisms often include numerous interconnecting parts, such as shafts, transmissions, and so forth. These interconnecting parts generally increase the space consumption, weight, and cost of wire feed mechanisms and the overall welding systems. In general, consumer welding systems have greater constraints on space consumption, weight, and cost as compared with commercial and industrial systems. However, it is generally desirable to offer new and existing features to both consumer welding systems and commercial and industrial welding systems.

BRIEF DESCRIPTION

In one embodiment, a system is provided with a welding wire feeder that includes a first wheel having a first rotational direction, and a second wheel having a second rotational direction opposite from the first rotational direction. The first and second wheels are disposed compressively about a wire feed region, and the first and second wheels are drivingly coupled together to output substantially equal tangential speeds in the wire feed region. In addition, the first wheel, or the second wheel, or both the first and second wheels comprise a drive wheel directly coupled to a gear without separately coupling both the drive wheel and the gear to a shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
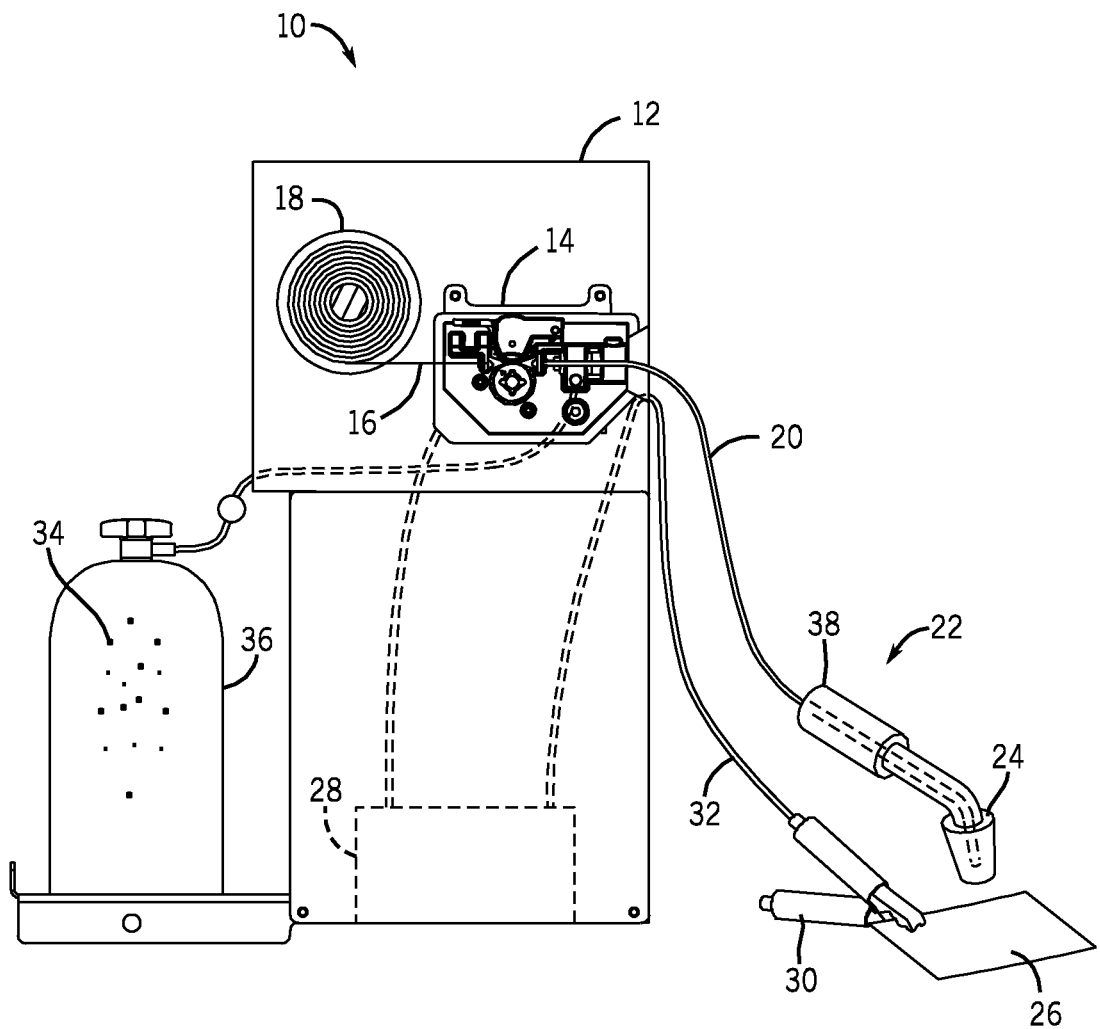
FIG. 1 is a side view of a welding system in accordance with an exemplary embodiment of the present technique.

Referring generally to FIG. 1, this figure depicts an exemplary portable MIG arc welding system 10 having a welding chassis 12 with a wire feeding assembly 14 disposed therein. As discussed in detail below, the wire feeding assembly 14 has certain features to improve the control, performance, and overall quality of the wire feeding, while also reducing the complexity, weight, space consumption, and cost associated with such features. Specifically, the wire feeding assembly 14 includes opposite drive wheels that are driven in a synchronized manner about a welding wire, thereby providing generally equal tangential forces onto opposite sides of the welding wire. For example, the opposite drive wheels may be directly engaged with one another via gears directly coupled to the drive wheels (e.g., interlocked or one-piece). The synchronized drive wheels substantially improve the control, performance, and overall quality of the wire feeding. For example, the welding wire is less likely to become damaged due to shear forces. In addition, the wire feeding assembly 14 provides the synchronized drive wheels without complex transmissions, shafts between the drive wheels and their respective gears, and so forth. As a result, the wire feeding assembly 14 can be incorporated into small scale welding systems, such as consumer welding systems, without substantially increasing space consumption, weight, and cost.

In the embodiments discussed in detail below, the wire feeding assembly 14 includes gear driven opposite wheels, enabling automatic feeding of the welding wire 16 from wire spool 18, on which the wire 16 is wound, into and through welding cable 20, leading to welding gun 22. Certain embodiments of the wire feeding assembly 14 may directly gear the opposite wheels together, thereby providing substantially uniform forward forces about opposite sides of the wire 16. In some embodiments, the opposite wheels of the wire feed assembly 14 may be drivingly coupled together via a belt and pulleys or grooves on the wheels, or a chain and sprockets on the wheels, or high friction (e.g., rubber) surfaces on the wheels. In this manner, the wire feeding assembly 14 may substantially reduce shear, curling, or other degradation or jamming of the wire 16. In the illustrated embodiment, the electrode wire 16 has a generally tubular shape and a metallic composition. A flux also may be disposed within the tubular metal electrode wire 16. Eventually, the electrode wire 16 passes through and protrudes from a welding contact tip and nozzle assembly 24, where the peripheral end or tip of the electrode wire 16 melts with a work piece 26 as an arc forms during a welding operation. In certain embodiments, the wire feeder 14 may be separate from the welding chassis 12, e.g., a stand-alone wire feeder 14.

A welding circuit is set up as follows. A power unit 28 is connected to the wire feeder 14, which is further connected to conductors disposed inside the welding cable 20. These conductors are adapted for transmitting current or power from the power unit 28 of the welding system 10 to the welding gun 22. The welding gun 22, in turn, transmits the current or power to the contact tip in the contact tip and nozzle assembly 24. The work piece 26 is electrically coupled to one terminal of the power unit 24 by a ground clamp 30 and a ground cable 32. Thus, an electrical circuit between the work piece 26 and the power unit 28 is completed when the electrode wire 16 of the welding gun 22 is placed in proximity to, or in contact with, the work piece 26, and the welding gun 22 is engaged to produce an arc between the wire 16 and the work piece 26. The heat produced by the electric current flowing into the work piece 26 through the arc causes the work piece 26 to melt in the vicinity of the arc, also melting the electrode wire 16. Thus, the arc generally melts a portion of the work piece 26 and a tip portion of the welding wire 16, thereby creating a weld with materials from both the work piece 26 and the welding wire 16.

In the illustrated embodiment, inert shield gas 34 stored in a gas cylinder 36 may be used to shield the molten weld puddle from impurities. For example, the gas cylinder 36 feeds gas 34 to the wire feeder 14. The gas 34 is fed, along with the electrode wire 16, through the welding cable 20 to the neck of the welding gun 38. The inert shield gas 34 prevents impurities entering the weld puddle and degrading the integrity of the weld. However, other shielding techniques, such as flux, may be used in certain embodiments of the welding system 10.

The welding system, such as the one shown in FIG. 1, provides a cost-effective welding system that may be used by to weld material including aluminum, steel and stainless steel. The welding system 10 may be used by home hobbyists to weld a variety of fixtures, structures, metal sheaths, ornaments and so forth. The welding system 10 may also be used in building maintenance, and in the automotive and maritime industries.

Figure 2:
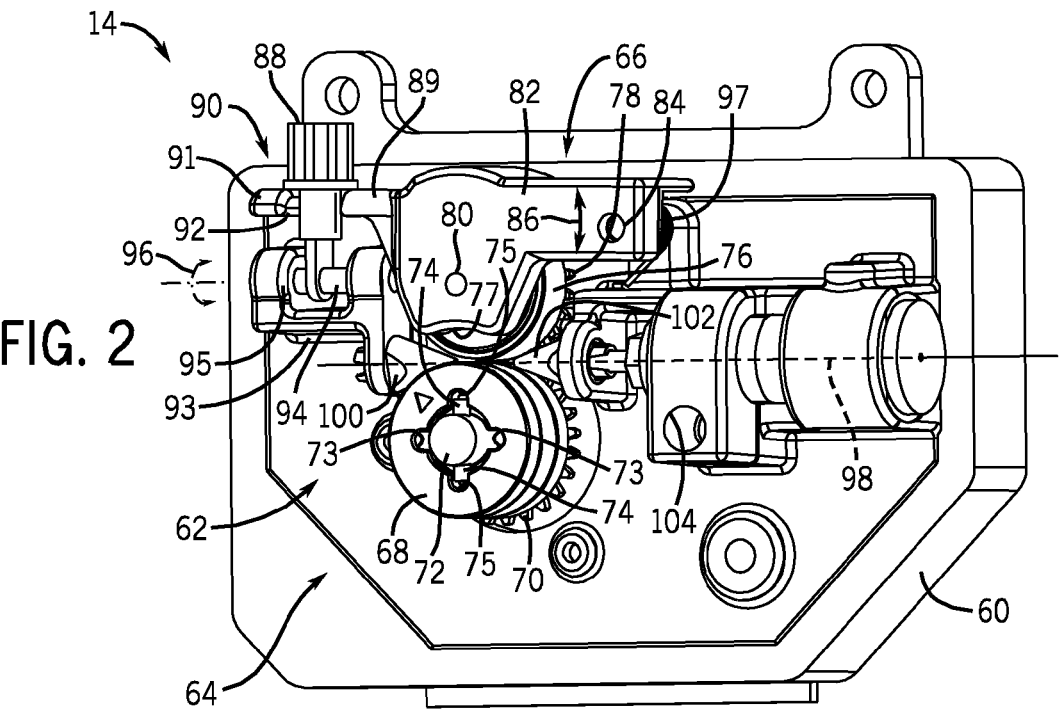
FIG. 2 is a perspective view of a wire feeding assembly in accordance with an exemplary embodiment of the present technique.
Figure 3:
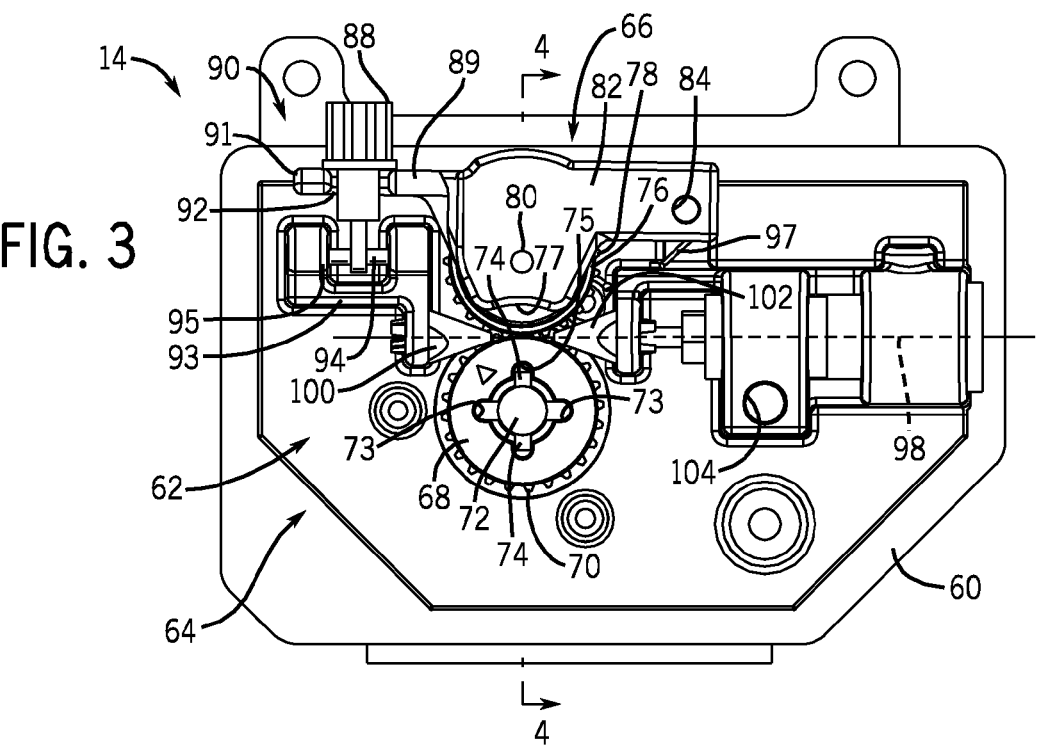
FIG. 3 is a side view of a wire feeding assembly in accordance with an exemplary embodiment of the present technique.

FIGS. 2 and 3 are perspective and side views, respectively, of the wire feed assembly 14 in accordance with an exemplary embodiment of the present technique. The wire feed assembly 14 includes a mount or a support structure 60 and a wheel drive assembly 62 disposed thereon. The wheel drive assembly 62 comprises a primary wheel assembly 64 and a secondary wheel assembly 66. The secondary wheel assembly 66 is disposed generally opposite from (e.g., adjacent and above) the primary wheel assembly 64. The primary wheel assembly 64 comprises a wheel 68 and a gear 70, both of which comprise a central opening, enabling their axial fitting over and through a motor shaft 72. The motor shaft 72 is coupled to a motor, which may be disposed behind the support structure 60 and coupled thereto.

Extending radially outward from the shaft 72 are two motor shaft prongs 74, disposed directly opposite to one another. The prongs 74 are configured to securely lock the wheel first 68 to the shaft 72, via U-shaped recessed portions 75. U-shaped passages or openings 73 extending from the outer planer surface of the first wheel 68 to its inner planner surface are used to pass the first wheel 68 past prongs 74 so that the wheel 68 may fit along the shaft 72. The first gear 70 comprises similar openings so that it, too, may pass along the prongs 74 of the motor shaft 72 as the shaft 72 extends lengthwise through the first gear 70. The gear 70 is disposed axially adjacent to the first wheel 68 such that it is axially exterior to the first gear 70 along the shaft 72. Further, the first wheel 68 and the first gear 70 comprise a fitting assembly, such as interlocking male and female structures that rotatably secure the first gear 70 with the first wheel 68, directly locking them together as the motor shaft 72 rotates. Thus, the first wheel 68 and the first gear 70 are directly coupled together. In certain embodiments, directly coupling the wheel 68 and the gear 70 may be done without an intermediate shaft (i.e., not indirect). In other words, the first wheel 68 may be directly coupled to the first gear 70 without separately coupling both the first wheel 68 and the first gear 70 to a shaft (e.g., at different positions on the shaft). Once fitted over the shaft 72 and aligned about openings 73, the first wheel 68 and the first gear 70 are mutually rotatable through a ninety degree rotation about the shaft 72 until the prongs 74 reach the U-shaped recessed portions 75. As a result, the prongs 74 reside in the U-shaped recessed portions 75 away from the openings 73 of the first wheel 68, thereby securely maintaining the wheel 68 and the first gear 70 about the motor shaft 72.

The secondary wheel assembly 66 comprises a second wheel 76 and second gear 78 disposed on the back side of the second wheel 76. Again, like the first wheel 68 and first gear 70, the second wheel 76 may be directly coupled to the second gear 78 without separately coupling both the second wheel 76 and the second gear 78 to a shaft (e.g., at different positions on the shaft). In certain embodiments, the second wheel 76 may be described as or embody a roller, sleeve or second wheel. In the illustrated embodiment, the second gear 78 is integral with the second wheel 76 as a single structure or one-piece unit. For example, the second gear 78 may be described as an integral portion of the outer perimeter of the second wheel 76. However, in other embodiments, the second gear 78 may be separate from but directly coupled to the gear drive second wheel 76. In certain embodiments, directly coupling the wheel 76 and the gear 78 may be done without an intermediate shaft. In either embodiment, the second wheel 76 and/or second gear 78 may collectively be described as or embody a gear drive wheel, a gear drive roller, or gear drive cap. Bearing 77 is centrally disposed within a hollow interior of the second wheel 76. The exterior circular surface of the bearing 77 generally coincides with the inner circular surface of the second wheel 76. For example, the bearing may be press fit inside the second wheel. The bearing 77 may include small ball bearings, lubricants, or other bearing mechanisms configured to facilitate rotation of the wheel 76.

The secondary wheel assembly 66 further comprises a shaft or rotational axis 80 about which the ball bearing 77 the gear drive second wheel 76 and the second gear 78 may be disposed. The rotational axis 80 is disposed along a rotatable wheel support 82, rotatable about a pivot joint 84, as indicated by arrows 86. The wheel support 82 is configured to maintain the secondary wheel assembly 66 above the primary wheel assembly 64 and to maintain a desirable pressure between those elements and welding wire 98.

Further, the wheel support 82 is fastened to one end of the mount 60 by an adjustment lever or arm 90. At another end, the wheel support 82 is coupled to the mount 60 via the pivot joint 84. A spring 97 is axially wound about the pivot joint 84 so as to rotatably bias the wheel support 82 about the pivot joint 84, for example, in a clockwise direction away from the primary wheel assembly 64. The adjustment lever 90 comprises a rotatable knob 88 used for adjusting the separation distance between the first wheel 68 and the second wheel 76. When in a locked position, the lever 90 is disposed within a receptacle 92 extending between an inner portion 89 and a peripheral portion 91 of the mount 60. The adjustment lever 90 is coupled to an adjustment lever shaft or axis 94 disposed within an adjustment lever receptacle 95, supported by an adjustment lever support 93. In such a configuration, the adjustment lever 90 is rotatable along lever shaft or axis 94, as indicated by arrows 96. The wheel support arm 82, pivot joint 84, spring 97, knob 88 and adjustment arm 90 may collectively embody a wire compression and spacing adjuster configured to adjustably compress welding wire 98 between the first and second wheels 68 and 76, respectively.

When rotated along lever axis 94, the lever arm 90 may engage or disengage from the receptacle 92. When the lever arm 90 is disengaged from the receptacle 92, the wheel support 82 is free to rotate about pivot joint 84. Disengaging the wheel support 82 enables its lifting so that, for example, the welding wire 98 can be removed from wire feeder 14 or that disassembly or assembly of the wire feeder 14 can be achieved during maintenance and the like. When the lever arm 90 is engaged with the receptacle 92, knob 88, by virtue of its rotatability, may apply a downward force on the wheel support 82 tensing the spring 97. This compresses the wire 98 between the first wheel 68 and wheel 76.

In the illustrated embodiment, mating of the first and second gears 70 and 78 causes the first and second wheels 68 and 76, respectively, to rotate at the same rate. In other embodiments, rotation of the first and second wheels 68 and 76 may be coupled via a belt, transferring motion of the first wheel 68 to the second wheel 76. In certain embodiments, mating of the first and second gears 70 and 78 may be done without an intermediate transmission and/or gear assemblies. Accordingly, by virtue of their coupled motion, both the first wheel 68 and the second wheel 76 may attain the same angular velocity, necessarily pointing in opposite directions. Thus, for example, rotating the first wheel 68 clockwise would cause the second wheel 76 to rotate counter clockwise. In the illustrated embodiment, a desired gear ratio of the first and second gears 70 and 78 and a desired wheel ratio of the first wheel 68 and the second wheel 76 exists such that these wheels attain a desirable equal tangential velocity on their outer circular perimeters. These ratios are generally based on the diameters or radii of the respective first gear 70 and the second gear 78 and the respective first and second wheels 68 and 76, respectively. In other embodiments, the gear and wheel ratios may be chosen so as to obtain a desirable tangential velocity on the outside perimeters of both of the first wheel 68 and second wheel 76 in accordance with varied operational needs. Thus, regardless of the gear and wheel ratios, the tangential velocities are generally uniform on the first wheel 68 and second wheel 76, thereby reducing the possibility of unequal forces, sheer, curling, jamming, or other problems with the wire 98. When the welding wire 98 comes in contact with the rotating first wheel 68 and second wheel 76, substantially or completely uniform frictional forces acting between the wire 98 and the first and second wheels 68 and 76 pull the wire 98 forward, causing the wire 98 to advance and move smoothly between wire guides 100 and 102.

In other embodiments, the wheel drive assembly 62 may include two wheels, such as the first and second wheels 68 and 76, comprising a rough textured material or generally high frictional material, such as rubber, disposed about the outer surface. Frictional forces arising between the two rubber first and second wheels 68 and 76 when the first wheel 68 is driven may drive the second wheel 76 as well. In such a configuration, the first wheel 68 and second wheel 76 may be directly coupled to one another without the first and second gears 70 and 78, a belt, a chain, or another connection mechanism.

Driving both first and second wheels 68 and 76 to rotate via the first and second gears 70 and 78 (or another direct drive mechanism, e.g., a belt) may result in a forward force applied to the wire 98 which may be greater than a force resulting in a system where only one wheel rotates. Having a greater force applied to the wire may increase the rate at which wire advances through the welding cable 20 (FIG. 1). This may also decrease the amount of frictional forces applied to the wire as it traverses between the first wheel 68 and the second wheel 76. Further, by having both of the first wheel 68 and the second wheel 76 advance the wire 98, curling and bending of the wire may be avoided as the wire advances through the wire feed assembly 14. Moreover, driving the wire 98 via a dual drive, i.e. via the first wheel 68 and the second wheel 76, reduces the amount of deformation experienced by the wire 98 when tension adjustments are applied to wire 98 by the user as the wire 98 is fed to the welding gun 22 (FIG. 1).

Again, the first wheel 68 and second wheel 76 may be driven via the first and second gears 70 and 78 to produce substantially or completely uniform tangential velocities and forces about opposite sides of the wire 98, which may force the wire 98 forward in a generally smooth linear direction without shearing, bending, jamming, and so forth. In addition, driving both the first wheel 68 and the second wheel 76 to rotate together permits automatic loading of the spool of wire 18 (FIG. 1) onto the wire feed assembly 14. For example, the simultaneously driven first and second wheels 68 and 76 enable an operator to simply put the wire 98 into the wire guide 100 and pull on a trigger of the welding gun 22 (FIG. 1) for the wire to feed.

In addition to the wheel drive assembly 62, the wire feed assembly 14 may include gas inlet 104 configured to accept a tubing leading from the gas cylinder 36 (FIG. 1), supplying the shielding gas 34 to wire feeder 14. Once fed into the gas inlet 104, the gas 34 and the welding wire are 16 may be fed together along the welding cable 20 to the welding gun 22 (FIG. 1). The wire feed assembly 14 also may include an outer cover or access panel disposed over the wheel drive assembly 62.

Figure 4:
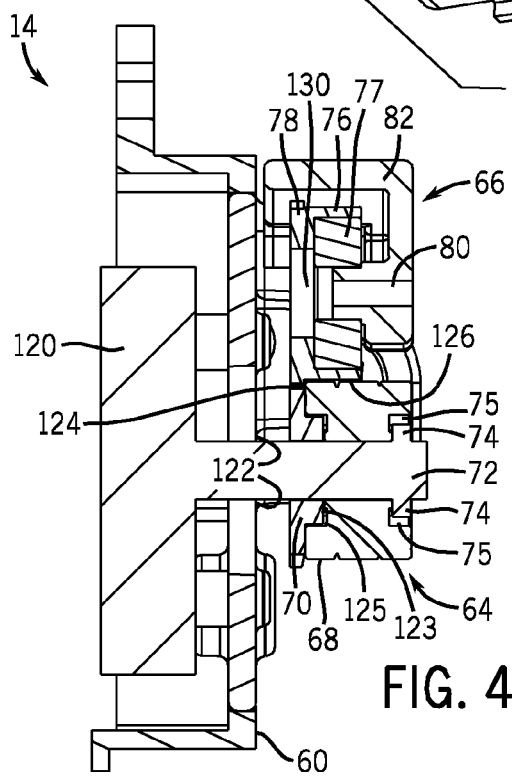
FIG. 4 is a cross section view of a wire feeding assembly in accordance with an exemplary embodiment of the present technique.

FIG. 4 is a cross-sectional view of the wire feed assembly 14 in accordance with an exemplary embodiment of the present technique. The cross-sectional view of the wire feed assembly 14 of FIG. 4 is taken along line 4 of FIG. 3. As shown by FIG. 4, base 120 of the motor shaft 72 is disposed on the backside of the support structure 60 of the wire feed assembly 14. The motor shaft 72 extends from the base 120 through opening 122 to the front side of the wire feed assembly 14. When the first wheel 68 and the first gear 70 are locked to the shat 72, the prongs 74 of the motor shaft 72 are disposed within the U-shaped recessed portions 75 of the first wheel 68. As further indicated by FIG. 4, a portion 123 of the gear 70 protrudes into a recess 125 in the first wheel 68, such that the first wheel 68 and the first gear 70 are coupled together and are driven as one by the motor shaft 72. Such a configuration adapts the shaft 72, the first wheel 68, and the gear 70 to be rotatable in unison.

In the illustrated embodiment, a circled region referred to by reference numeral 124 depicts the region the first gear 70 and the second gear 78 mate with one another. That is, this is the region encompassed by teeth of the first and second gears 70 and 78 when those are entwined with one another during rotational motion of the two gears. Disposed adjacent to the region 124 are circumferential or cylindrical grooves 126 and 128 configured for guiding and maintaining the welding wire 98 when disposed between the first and second wheels 68 and 76.

As further illustrated in FIG. 4, the rotational axis 80 extends from the outer surface of the wheel support arm 82 to a rear portion or base 130, such that the base 130 of the axis 80 fits within the bottom portion of the second wheel 76. Further, the wheel support arm 82 is securely held to the second wheel 76 and the second gear 78 via the rotational axis 80. As further depicted by FIG. 4, the wheel support arm 82 is coupled together with the first wheel 76, ball bearing 77, and second gear 78 as a single moveable or rotatable assembly, which enables positional adjustment of the second wheel 76 relative to the first wheel 68.

Figure 5:
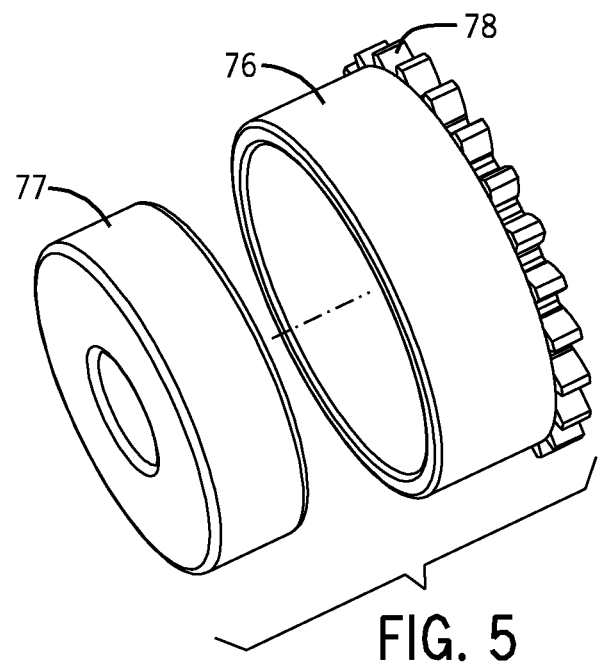
FIG. 5 is a perspective exploded view of a gear drive second wheel and a ball bearing in accordance with an exemplary embodiment of the present technique.
Figure 6:
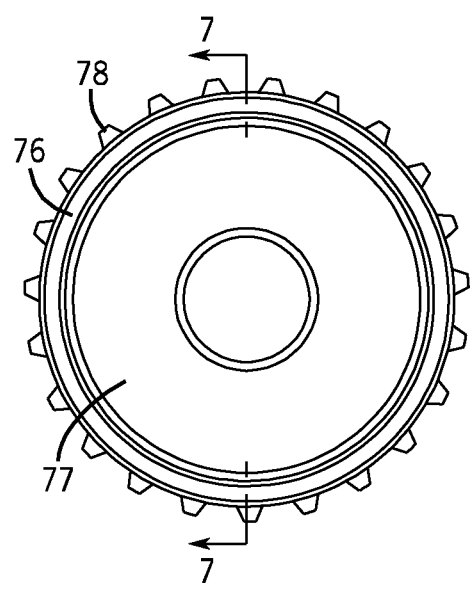
FIG. 6 is a top view of a gear drive second wheel and a ball bearing in accordance with an exemplary embodiment of the present technique.
Figure 7:
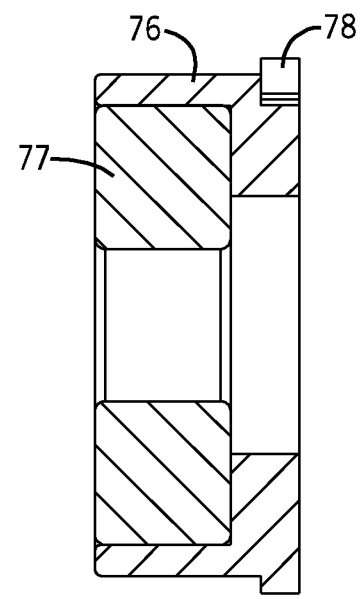
FIG. 7 is a cross section view of a gear drive second wheel and a ball bearing in accordance with an exemplary embodiment of the present technique.

FIGS. 5-7 are different views the second wheel 76, the ball bearing 77 and the second gear 78, in accordance with an exemplary embodiment of the present technique. In the illustrated embodiment, the second wheel 76 may be coupled directly to the second gear 78. For example, the second wheel 76 and the second gear 78 may form a continuous one-piece unit. In one embodiment, such an assembly may be fabricated by casting powdered metal. In the other embodiments, the second wheel 76 and the second gear 78 may comprise separate parts and may be directly coupled together in the same manner the wheel 68 and the gear 70 are coupled to one another.

FIG. 5 is an exploded perspective view showing the manner by which the gear drive second wheel 76 slides over the ball bearing 77 to form a structure couplable to the support arm 82 of the secondary wheel assembly 66. For example, the second wheel 76 may be press fit directly about the bearing 77. The central opening of the ball bearing 77 is couplable to the central axis 80 of the support arm 82 of the secondary wheel assembly. FIGS. 6 and 7 illustrate a top and a cross sectional view, respectively, of the second wheel 76, the ball bearing 77 and the second gear 78 as those components are fitted together. The cross section view of FIG. 7 is taken along line 5 depicted in FIG. 6.

Directly coupling the gear drive second wheel 76 to the second gear 78 as well as press fitting the gear drive second wheel 76 over the bearing 77 without a shaft or a second motor comprises an easy and cost-effective assembly usable as part of the secondary wheel assembly 66 of wire feed assembly 14.

Figure 8:
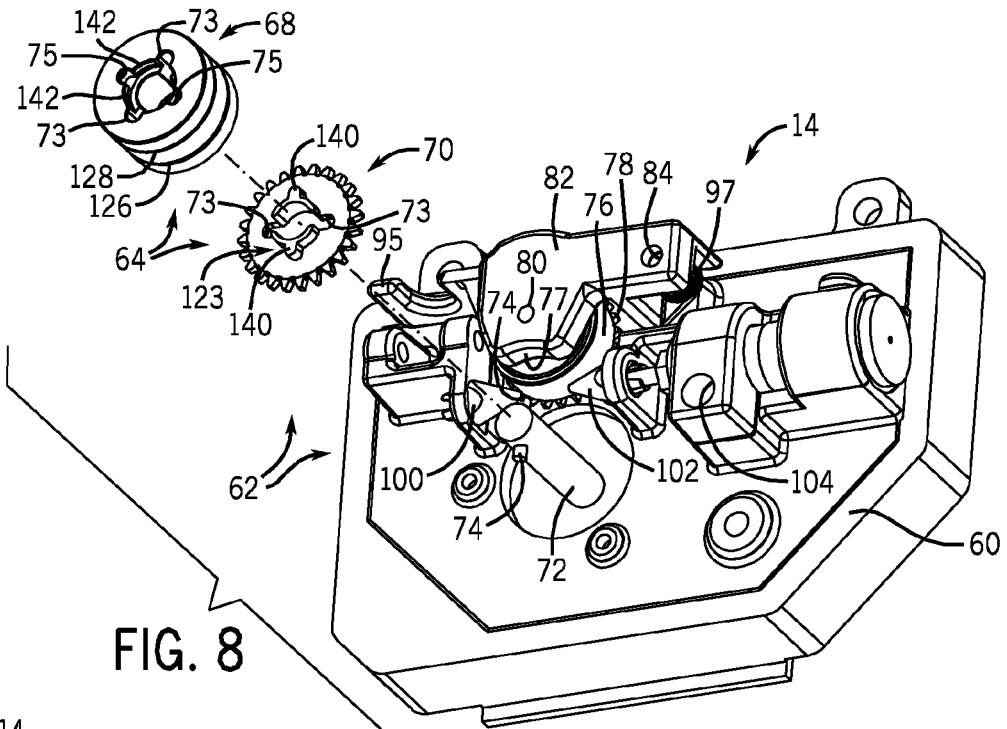
FIG. 8 is an exploded view of a wire feeding assembly in accordance with an exemplary embodiment of the present technique.

FIG. 8 is an exploded view of the wire feed assembly 14 in accordance with an exemplary embodiment of the present technique. The figure depicts the manner by which the first wheel 68 and the first gear 70 are both fitted over and about the shaft 72. The first gear 70 comprises U-shaped passage 73, similar to those engraved into the first wheel 68, shown in FIG. 8 as well. As described below, the passages 73 enable the first gear 70 and the first wheel 68 to slide past the prongs 74 of the motor shat 72. Further, the portion 123 includes locking structures 140, extending above the surface of the gear 70, adapted to fit within the recess 125 (including complementary recessed portions 164) disposed on the backside of the first wheel 68 when both the first gear 70 and the first wheel 68 are fitted over the shaft 72. Such a configuration couples the first wheel 68 and the first gear 70 such that both are rotatable when the shaft 72 rotates.

As further depicted by FIG. 8, the two U-shaped recessed portions 75 and U-shaped passages 73 of the first wheel 68, are disposed at 90 degrees relative to one another. Semicircular grooves or recessed portions 142, disposed on an intermediate surface disposed below the outer plane surface of the first wheel 68, circularly extend from inner portions of passages 73 to recessed portions 75. The recessed portions 75 are indented somewhat beneath the outer surface of the first wheel 68 so as to house the prongs 74 of the shaft 72 once the first wheel 68 and the first gear 70 are securely held to the shaft 72. Thus, as the first gear 70 is fitted over the shaft 72 and the first wheel 68 is disposed thereon, openings 73 of the first wheel 68 and of the first gear 70 are aligned. Also, in this configuration, locking structures 140 of the first gear 70 fit into complementary recessed portions disposed on the backside of the first wheel 68. In this unlocked configuration, the prongs 74 may extend a bit beneath the surface of the first wheel 68, as these are loosely disposed within openings (e.g., slots) 73. Applying a rotation of 90 degrees to the first wheel 68, the prongs 74 slide along the semicircular grooves or recessed portions 142 until the prongs 74 securely fit within the locking recessed portions 75. Once the prongs 74 lock with the portions 75, sufficient axial pressure is applied to the first wheel 68 so that rotational motion may be properly transferred from the shaft 72 to the first wheel 68, in turn transferring its rotational motion to the first gear 70.

Figure 9:
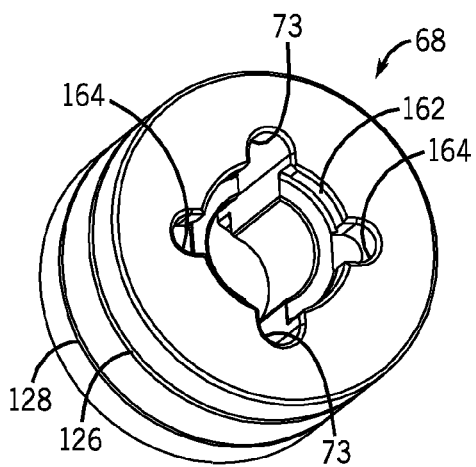
FIG. 9 is a rear perspective view of a gear driven wheel in accordance with an exemplary embodiment of the present technique.

FIG. 9 is a rear perspective view of the first wheel 68 in accordance with an exemplary embodiment of the present technique. The figure depicts the manner by which the wheel 68 may lock into the gear 70. Accordingly, passages 73 of the first wheel 68 are adapted to slide over prongs 74 of the motor shaft 72 so that the wheel 68 may be disposed on top of the first gear 70. Complementary semi-circular recessed portions 162 and U-shaped recessed portions 164 disposed on the backside of the first wheel 68 are adapted to mate with the U-shaped semi-circular locking structures 140 of first gear 70 shown in FIG. 8. Such a configuration maintains the first gear 70 secure to the first wheel 68 and permits rotational motion to be transferred from the first wheel 68 to the first gear 70. In some embodiments, the front and back sides of the first wheel 68 may be identical such that elements 75 and 142 disposed on the front side of the first wheel 68 may be identical to elements 164 and 162 disposed on the back side of the first wheel 68, respectively. Such an embodiment would permit to flip the first wheel 68 about the shaft 72 so that the grooves 126 or 128 may be utilized to guide the wire in accordance with the type of welding wire employed for a particular task.

Again, the first and second wheel 68 and 76 are driven together by the first and second gears 70 and 78 (or another direct coupling—e.g., belt) to produce substantially uniform tangential velocities and forces about opposite sides of the wire 98. In this manner, the wheel drive assembly 62 reduces the possibility of sheer, curling, or jamming of the wire 98. In other words, the wheel drive assembly 62 drives the wire uniformly on both sides to direct the wire in a generally straight or linear direction. Further, driving the wire 98 via a dual drive, i.e. via the first wheel 68 and second wheel 76, reduces the amount of deformation experienced by the wire 98 when tension adjustments are applied to wire 98 by the user as the wire 98 is fed to the welding gun 22 (FIG. 1).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
  a welding wire feeder, comprising:
    a first wheel having a first rotational direction, wherein the first wheel comprises a central passage, opposite slots disposed axially along the central passage, opposite recesses disposed on an axial end of the first wheel angularly away from the opposite slots, and opposite radially inward facing semi-circular recessed portions, each extending from a respective opposite recess toward both of the opposite slots;
    a drive shaft comprising opposite prongs, wherein the opposite prongs are configured to pass along the opposite slots during insertion and removal of the drive shaft relative to the central passage, and the opposite prongs are configured to rotate from the opposite slots to the opposite recesses at the axial end; and
    a second wheel having a second rotational direction opposite from the first rotational direction, wherein the first and second wheels are disposed compressively about a wire feed region, and the first and second wheels are drivingly coupled together to output substantially equal tangential speeds in the wire feed region.

2. The system of claim 1, wherein the first and second wheels are directly geared together.

3. The system of claim 1, comprising first and second gears directly coupled to the first and second wheels, respectively, wherein the first and second gears mate with one another without an intermediate transmission.

4. The system of claim 1, comprising a motor coupled to the drive shaft.

5. The system of claim 1, wherein the first wheel comprises a gear and a drive wheel comprising interlocking male and female structures that rotatably secure the gear with the drive wheel.

6. The system of claim 1, wherein the second wheel comprises a one-piece geared wheel having a gear and a drive wheel.

7. The system of claim 1, wherein the first and second wheels are drivingly coupled together via a belt and pulleys on the wheels.

8. The system of claim 1, wherein the first and second wheels are drivingly coupled together via grooves on the wheels.

9. The system of claim 1, wherein the first and second wheels are drivingly coupled together via a chain and sprockets on the wheels.

10. The system of claim 1, wherein the first and second wheels are drivingly coupled together via high friction surfaces on the wheels.

11. A system comprising:
a welding wire feeder, comprising:
a first geared wheel having a first perimeter;
a second geared wheel having a second perimeter generally tangential with the first perimeter of the first geared wheel, and the first and second geared wheels are geared together, wherein the second geared wheel comprises a central passage, opposite slots disposed axially along the central passage, opposite recesses disposed on an axial end of the second geared wheel angularly away from the opposite slots, and opposite radially inward facing semi-circular recessed portions, each extending from a respective opposite recess toward both of the opposite slots; and
a drive shaft comprising opposite prongs, wherein the opposite prongs are configured to pass along the opposite slots during insertion and removal of the drive shaft relative to the central passage, and the opposite prongs are configured to rotate from the opposite slots to the opposite recesses at the axial end.

12. The system of claim 11, wherein the first and second geared wheels produce substantially equal tangential forces.

13. The system of claim 11, comprising a motor coupled to the second geared wheel.

14. The system of claim 3, wherein the first gear comprises semi-circular locking structures configured to mate with the opposite recesses and the opposite radially inward facing semi-circular recessed portions of the first wheel.

15. The system of claim 11, wherein the second geared wheel comprises a gear having semi-circular locking structures configured to mate with the opposite recesses and the opposite radially inward facing semi-circular recessed portions of the second geared wheel.

16. The system of claim 11, wherein the first geared wheel comprises a one-piece unit having a wheel body and attached gear.

* * * * *